US007272595B2

(12) United States Patent
Tsuchitani et al.

(10) Patent No.: US 7,272,595 B2
(45) Date of Patent: Sep. 18, 2007

(54) INFORMATION SEARCH SUPPORT SYSTEM, APPLICATION SERVER, INFORMATION SEARCH METHOD, AND PROGRAM PRODUCT

(75) Inventors: Hajime Tsuchitani, Kamakura (JP); Saeko Murakami, Yokohama (JP); Hirobumi Toyoshima, Machida (JP); Nozomu Matsushita, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 10/653,512

(22) Filed: Sep. 2, 2003

(65) Prior Publication Data
US 2004/0054672 A1    Mar. 18, 2004

(30) Foreign Application Priority Data
Sep. 3, 2002    (JP)    ............................. 2002-257970

(51) Int. Cl.
G06F 17/30    (2006.01)
(52) U.S. Cl. ......................................... 707/3; 707/200
(58) Field of Classification Search ................ 707/200, 707/104.1, 1, 10, 8, 6, 5, 4
See application file for complete search history.

(56) References Cited

U.S. PATENT DOCUMENTS 6,076,088 A * 6/2000 Paik et al. ..................... 707/5
6,327,586 B1 * 12/2001 Kisiel ............................. 707/2
6,675,159 B1 * 1/2004 Lin et al. ........................ 707/3
7,099,885 B2 * 8/2006 Hellman et al. ......... 707/103 R

FOREIGN PATENT DOCUMENTS

| JP | A-2000-242650 | 2/1999 |
|---|---|---|
| JP | A-H11-126209 | 5/1999 |
| JP | A-2000-222436 | 8/2000 |
| JP | A-2000-276487 | 10/2000 |
| JP | A-2001-84252 | 3/2001 |

* cited by examiner

*Primary Examiner*—Mohammad Ali
*Assistant Examiner*—Leon J. Harper
(74) *Attorney, Agent, or Firm*—Richard M. Goldman

(57) ABSTRACT

A system includes a vocabulary information processing mechanism for loading an ontology corresponding to a selected service and analyzing the loaded ontology to extract a conceptual structure, an inference processing mechanism for executing an inference operation based on an axiom rule and extending/parsing vocabulary information extracted by the vocabulary information processing mechanism, a conceptual information display section for displaying the extracted conceptual structure on a browser of a user terminal via the Internet, a property information display section for displaying on the browser property information relative to a concept selected from the displayed conceptual structure, a relational information display section for displaying, when a plurality of concepts are selected, relationships between the concepts on the browser, and a search request transmitting section 34 for transmitting a prescribed search request to a search system based on a search request made from the browser.

5 Claims, 7 Drawing Sheets

INFORMATION SEARCH SUPPORT SYSTEM, APPLICATION SERVER, INFORMATION SEARCH METHOD, AND PROGRAM PRODUCT

FIELD OF THE INVENTION

The present invention relates to an information search support system, and more specifically, relates to an information search support system for providing a user interface that can define relationships between concepts/properties.

BACKGROUND

In recent years, following the spread of utilization of the Internet, a large-scale information search system has been constructed by mutually connecting various databases, with the result that the number of databases users can access has been rapidly increased. On the other hand, with the reduction in size of computer apparatuses and the progress of the mobile communication technology, the mobile computing technology has also been largely developed wherein accesses are made from visiting remote places via radio communication channels and the like. In the development of the technology, the construction of an advanced search system has been strongly desired that can quickly acquire information users aim at, using a simple technique.

Presently, for the search using the Web on the Internet, there are available a search method wherein a plurality of words are inputted and relationships between them are defined using only the AND, OR and NOT logical operators, and a full text search method wherein a natural language is inputted and a morphemic analysis is conducted to extract words, thereby implementing a search. According to this full text search method, it is possible to prompt a user to input a keyword composed of a natural language or words and, based on the inputted keyword, retrieve information matching such a keyword. There is also a directory search method wherein a category a user takes an interest in is traced by tracing an intended item among preclassified categories, thereby retrieving data that can be speculated from such an interest.

On the other hand, as a conventional search technique, there is one that, by using a cluster representative structure as an index relative to document clusters having been subjected to clustering in advance, enables an analogous document search taking a sentence structure into account even when a large-scale document set is a search object (e.g. see JP-A-2001-84252, pp. 4-5, FIG. 1). There is also a technique wherein case data obtained by extracting respective case sentences from electronic documents described in natural language and classifying them is stored in a case database and comparison is made between an inputted search sentence and the case sentences classified and stored in the case database (e.g. JP-A-2000-276487, pp. 8-9, FIG. 1). Further, there is also a technique wherein an inference using domain-dependent conceptual knowledge is made so as to obtain a search result with small search garbage through semantic structural comparison (e.g. see JP-A-2000-242650, pp. 4-5, FIG. 2).

There is also a technique wherein concepts of information managed in databases are registered in an ontology with an array that depends on abstraction degrees of the respective concepts, thereby to produce a database selection menu based on the concepts registered in the ontology and perform maintenance and management of the database selection menu (e.g., see JP-A-2000-222436, pp. 5, FIG. 1). Further, there is also a technique wherein a plurality of search conditions and dates are inputted and search conditions are combined using ontologies with respect to the individual conditions (e.g. see JP-A-H11-126209, pp. 8, FIG. 5).

Thus, it is seen that a full text search engine being the foregoing existent search user interface, although it is easy for a user to input, but difficult to perform an accurate search. On the other hand, in case of a directory search engine, it is easy to search for intended information because it can be speculated from a user's interest, but, inasmuch as directories are formed with a predetermined structure, expansion is difficult, thus lacking in flexibility.

Further, according to the techniques described in the above cited literature it is set as an ideal to input a natural language as a search key, so that there is limitation in terms of accurately inputting a user's high-level search request. Further, according to the technique described in JP-A-2000-222436 (pp. 5, FIG. 1), it is necessary to manually carry out maintenance and management of database search menus, so that loads thereof become extremely large at the present time when addition and deletion of various databases are frequently implemented. Furthermore, according to the technique described in JP-A-H11-126209 (pp. 8, FIG. 5), inasmuch as ontologies are strictly applied to the search conditions, it can not deal with a user's high-level search request.

Recently, a new Web scheme called "Semantic Web" has been proposed as the concept of next generation Web by the W3C (World Wide Web Consortium) being the international standardization organization about Web. A working group has started in the W3C in February 2001 and submitted DAML+OIL (DARPA Agent Markup Language/Ontology Inference Language) as an ontology language at the end of 2001. Following it, also in Japan, AIDOS (Advanced Integrated Documents Standardization committee) of Information Technology Research and Standardization Center of Japanese Standards Association, Semantic Web Committee of Interoperability Technology Association for Information Processing, Japan, have been actively operating for standardization.

This "Semantic Web" gives semantics (semantic information) on Web sites as metadata and creates spaces where data can be mechanically processed without using human hands. Based on XML and formalizing semantic information of a data structure, an agent can automatically understand the meaning and perform processing. For example, in the current search system, if a search is conducted using both "Yokohama" and "travel agent", a travel agent of Tokyo planning a Yokohama Harbor tour is also retrieved, so that it is necessary for a user to exclude unnecessary information based on the search result. In case of "Semantic Web", if a place of an agent is given as metadata on a Web page, "travel agents located in Yokohama" is mechanically retrieved.

Presently, it is very difficult to conduct a search corresponding to a high-level need. When the foregoing "Semantic Web" is generally constructed, such a search that is more accurate than the keyword-based full text search widely used at present is desirable. Specifically, for enabling a further intellectual search on "Semantic Web" being the next generation Web, an advanced user interface that can describe relationships between metadata is desirable.

SUMMARY OF THE INVENTION

The present invention has been made for solving the foregoing technical problems and has an object to provide an interface that enables inputting of a user's high-level search request.

Another object of the present invention is to provide an interface that can dynamically update an ontology depending on a service.

As described above, according to the present invention, it is possible to provide an interface that can input a user's high-level search request in a search system using the Web.

THE FIGURES

Various aspects of the invention are illustrated in the Figures appended hereto.

DETAILED DESCRIPTION

Figure 1:
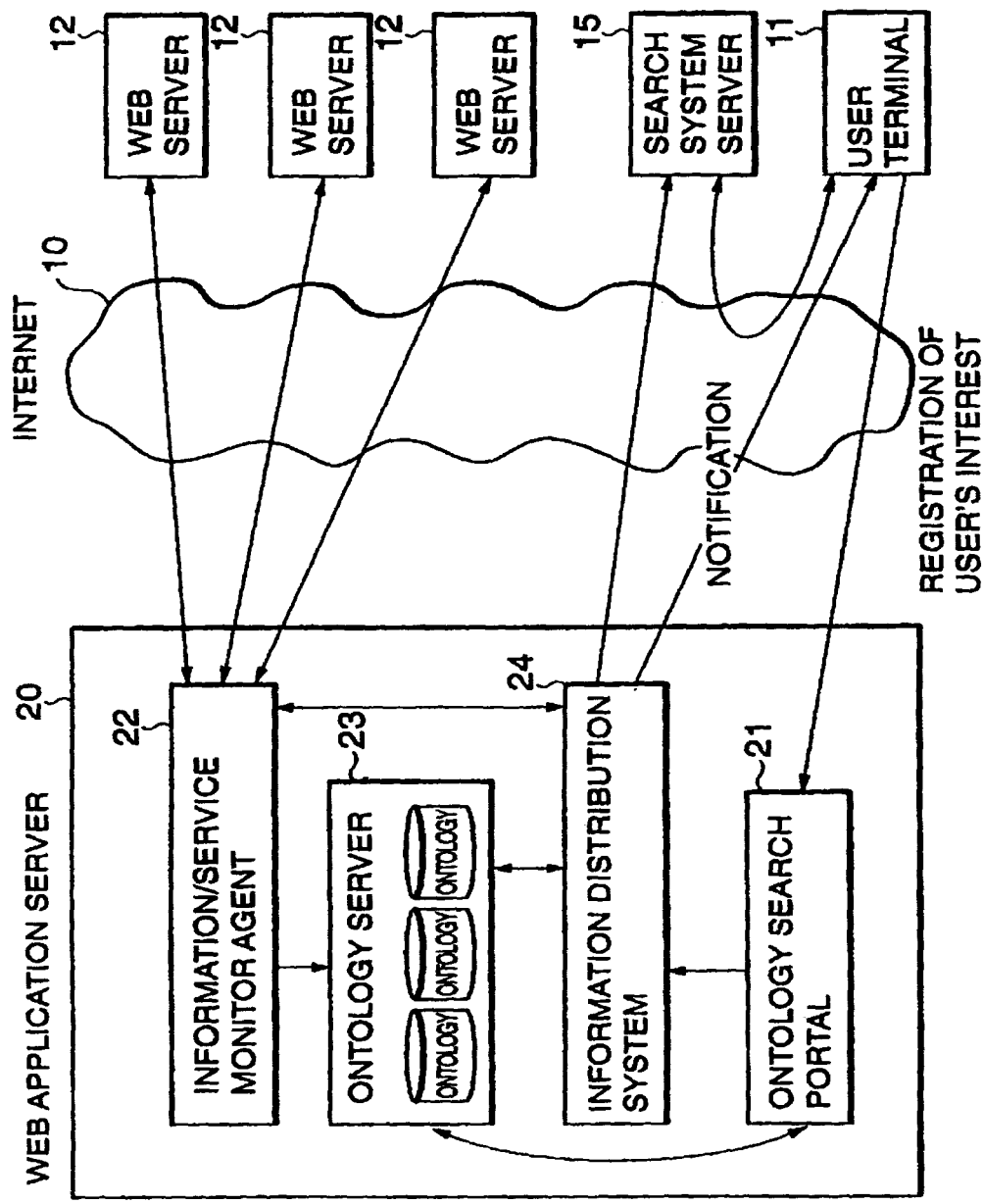
FIG. 1 is a diagram showing the overall structure of an ontology search UI system according to a preferred embodiment of the present invention.

For accomplishing the foregoing objects, the present invention makes it possible to provide an information search support system that can suitably express a user's intention, by displaying a relationship among concepts and attributes thereof in a hierarchy structure having multiple roots and explicitly designating a relationship between concepts, a relationship between attributes, and restrictions. Specifically, an information search support system applied with the present invention comprises ontology extracting means for, based on a service selection command from a browser, extracting an ontology corresponding to a selected service; storing means for analyzing the ontology extracted by the ontology extracting means and storing into a memory a conceptual structure, which is, for example, a conceptual tree structure taking a parent-child relationship into account, and details of properties corresponding to respective concepts; concept window display means for calling the conceptual structure stored in the storing means and displaying it in a display area of the browser; property window display means for calling from the storing means details of a property corresponding to a concept selected from the conceptual structure displayed by the concept window display means and displaying them in a display area of the browser; relationship input window display means for displaying in a display area of the browser a relationship input window for defining relationships between two or more concepts selected from the displayed conceptual structure, or relationships between two or more properties selected from displayed properties; and input confirmation window display means for displaying in a display area of the browser an input confirmation window for confirming information inputted using the concept window display means, the property window display means and the relationship input window display means.

Further, an application server applied with the present invention comprises a vocabulary information processing mechanism for loading an ontology corresponding to a selected service and analyzing the loaded ontology to extract a conceptual structure; an inference processing mechanism for executing an inference operation based on an axiom rule and extending/parsing vocabulary information extracted by the vocabulary information processing mechanism; a conceptual information display section for displaying the conceptual structure extracted by the vocabulary information processing mechanism on a browser of a user terminal via a network; a property information display section for displaying on the browser property information relative to a concept selected from the conceptual structure displayed on the browser by the conceptual information display means; a relational information display section for displaying, when a plurality of concepts are selected by the conceptual information display section, relationships between the concepts on the browser; and a search request transmitting section for transmitting to a search system a prescribed search request based on a search request made relative to the windows displayed on the browser by the conceptual information display section, the property information display section and the relational information display section.

Here, the conceptual information display section displays on the browser a concept window in which a prescribed concept can be selected by tracing a tree; the property information display section displays on the browser a property window displaying an item for which inputting of a property is allowed, the property window enabling inputting of a restriction condition relative to the item; and the relational information display section displays on the browser a relationship input window that enables inputting of a relationship between the concepts and/or a relationship between properties selected by the property information display section.

The application server further comprises an ontology search portal for calling a service selection menu list based on access made from the browser in the user terminal, displaying the service selection menu on the browser, and accessing an ontology server offering the ontology based on service selection from the browser.

On the other hand, an information search method applied with the present invention comprises a step of receiving a selection command of a service from a browser; a step of extracting an ontology corresponding to the service for which the selection command is received; a step of analyzing the extracted ontology and storing into a memory details of a conceptual structure and details of properties corresponding to respective concepts; a step of calling the conceptual structure stored in the memory and displaying it in a display area of the browser; a step of extending/compressing vocabularies using an inference engine relative to the concepts selected from the conceptual structure; a step of calling from the memory details of properties corresponding to concepts selected from the displayed conceptual structure and displaying them in a display area of the browser; a step of displaying in a display area of the browser relational information defining relationships between the selected concepts and/or relationships between the properties; a step of receiving an input from the browser relative to the conceptual structure, the details of the properties and the relational information displayed in the display areas; and a step of transmitting a search request to a search system on the Semantic Web based on the received input.

Further, from another aspect, the present invention is an information search method for conducting an information search by displaying a search window on a browser of a user terminal, which comprises a step of displaying on the browser a conceptual structure based on an analysis of an ontology performed relative to service selection from the browser; a step of displaying on the browser details of a property relative to a concept selected from the displayed conceptual structure; a step of displaying, when a plurality of concepts are selected, relationships between the selected concepts on the browser; a step of displaying, when a plurality of properties are inputted from the displayed details of the property, a window defining relationships between the properties on the browser; and a step of displaying on the browser an input confirmation window for confirming information inputted using displayed respective display windows.

Further, the present invention can be understood as a program that is executed by a computer serving as a server connected to a network. This program causes a computer to have a function of loading an ontology corresponding to a service selected from a user terminal; a function of analyzing the loaded ontology to extract a conceptual structure; a function of storing into a memory the extracted conceptual structure, details of properties corresponding to respective concepts, and a relational structure definable between the concepts; a function of calling the conceptual structure stored in the memory and displaying it on a browser of the user terminal via a network; a function of reading from the memory details of properties relative to concepts selected from the conceptual structure displayed on the browser and displaying the details of the properties on the browser via the network; a function of calling from the memory a relational structure in the selected concepts and displaying it on the browser via the network; a function of receiving an input from the browser relative to the displayed conceptual structure, details of the properties and relational structure; a function of transmitting a search request to a search system based on the received input; and a function of extending/compressing vocabularies using an inference engine relative to the concepts selected from the conceptual structure.

The program may be offered to a customer in the state wherein the program is installed in a computer such as a server when the computer is offered to the customer, or in the state wherein the program is stored in a storage medium in a computer-readable manner. The storage medium may be, for example, a CD-ROM, wherein the program is read by a CD-ROM drive and loaded into a flash ROM or the like, thereby to be executed. On the other hand, the program may also be offered via a network by means of, for example, a program transmitter. This program transmitter, for example, may be provided in a server on the host side and include a memory for storing programs and program transmitting means for offering programs via the network.

In a particularly preferred embodiment of the invention, which is illustrated in FIG. 1. FIG. 1 is a diagram showing the overall structure of an ontology search UI system according to this embodiment. The ontology search UI system shown in FIG. 1 comprises a user terminal 11 such as PDA (Personal Digital Assistant) or a note PC that is connectable to a network, Web servers 12 offering Web pages that are, for example, provided for respective companies and composed of various catalogs and information, a Web application server 20 that offers a service of the ontology search UI system in this embodiment to the user terminal 11, and a search system server 15 that outputs a search result to the user terminal 11 in response to a search request from the Web application server 20. The Web application server 20, and the Web servers 12, the user terminal 11 and the search system server 15 are connected via a network such as the Internet 10.

Here, it is possible to take only the Web application server 20 as an ontology search UI system in a narrow sense. In this case and others, the word "system" does not question whether respective functions are included in the same housing or connected by a prescribed network. Further, the Web server 12 may be the Semantic Web the W3C has taken the lead in starting to develop, i.e. the next generation Web that gives semantics (semantic information) as metadata on a Web site, and creates a space where data can be mechanically processed without using human hands. It may also be configured that servers corresponding to the Semantic Web are provided apart from the Web servers 12 that collect information, and metainformation relative to the existent Web servers 12 is stored in such servers corresponding to the Semantic Web and searched by the search system server 15.

The Web application server 20 comprises an ontology search portal 21 that receives a registration of a user's interest from the user terminal 11 and offers a service list corresponding to the user's interest, an information/service monitor agent 22 that collects information from the Web servers 12 of the respective companies via the Internet 10, an ontology server 23 that stores ontologies representing relationships among vocabularies in databases and offers vocabulary information groups, and an information distribution system 24 that offers to the user terminal 11 an information search service including a conceptual information display, a property information display, a display of relationships between concepts/properties based on a user's request obtained via the ontology search portal 21.

The ontology server 23 is configured such that ontologies (e.g. entertainment ontology, delivery service ontology, and event ontology) that differ per object are stored in the corresponding databases as domains to be searched, and the ontology corresponding to a selected service can be offered.

Here, "ontology" is one of methods for expressing semantic information and is a set of sentences that define relationships among concepts and logical rules for interpreting them. For example, it is assumed that a content of "Sunday, the morning, Yamato, internal department" is searched. In the Web of the present state, the words are taken out as they are from HTML and outputted as a search result so that a lot of search garbage has been generated. On the other hand, in the method using "ontology", logical rules are defined for interpreting (a) Yamato is a name of the city, (b) A hospital includes the internal department, the department of surgery and the department of otolaryngology, (c) There are consultation days and hours in a hospital, and the like, and a search result can be obtained from a set of those sentences. For example, semantics are given on a Web site as metadata in the Semantic Web, wherein RDF (Resource Description Framework) can be used with respect to the structure of metadata, and the RDF schema can be used as to how to give metadata. In "ontology", relationships among metadata are described, and predicate relationships of the class hierarchy are described using the RDF schema. For example, as concepts (classes) and properties, a parent-child relationship is shown by "subClassOf", and an inverse relationship is shown by "inverseOf". If the ontology is used on the Semantic Web, a further intellectual search is made possible.

Figure 2:
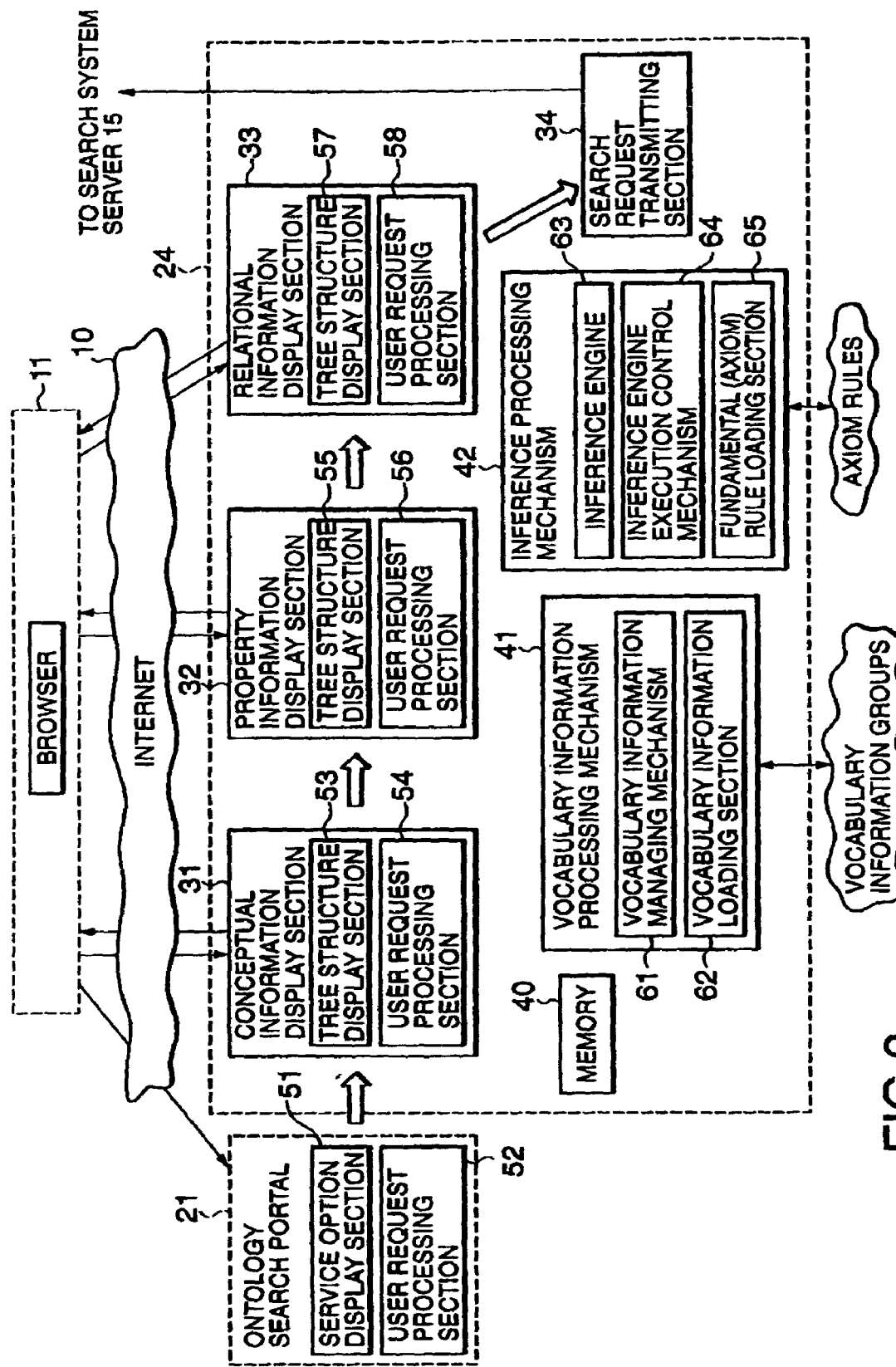
FIG. 2 is a block diagram showing in further detail a functional structure of a Web application server according to the preferred embodiment.

FIG. 2 is a block diagram showing in further detail a functional structure of the Web application server 20 according to this embodiment. The ontology search portal 21 comprises a service option display section 51 for calling a service selection menu list based on access from a browser in the user terminal 11, and a user request processing section 52 for receiving service selection from the user terminal 11 based on the service selection menu list and accessing the ontology server 23.

The information distribution system 24 comprises a memory 40 as storing means where various information is stored and the stored information is read out upon displaying on the browser, a vocabulary information processing mechanism 41 as ontology extracting means for loading an ontology corresponding to a selected service from the ontology server 23 and analyzing it, and an inference processing mechanism 42 for implementing an inference operation based on an axiom rule stored in a prescribed database (not shown) or the like, thereby to extend and parse various vocabulary information. The vocabulary information processing mechanism 41 includes a vocabulary information managing mechanism 61 for managing a vocabulary information group, and a vocabulary information loading section 62 for loading vocabulary information from the ontology server 23. The inference processing mechanism 42 includes an inference engine 63 for executing an inference operation, an inference engine execution control mechanism 64 for controlling execution of the inference engine 63, and a fundamental (axiom) rule loading section 65 for loading an axiom rule group from a prescribed server or the like. Other than provided in the prescribed Web server and read by the fundamental (axiom) rule loading section 65, several manners may be considered with respect to the axiom rules, for example, the axiom rules may be stored in the memory 40 as a file within the information distribution system 24 and read out when necessary.

The information distribution system 24 further comprises a conceptual information display section 31 as concept window display means for calling a conceptual tree structure stored in the memory 40 and displaying it at a corner of the browser in the user terminal 11, a property information display section 32 as property window display means for displaying details of properties corresponding to the concept on the browser, and a relational information display section 33 as relationship input window display means for displaying property relationships, conceptual relationships or the like on the browser. The information distribution system 24 further comprises a search request transmitting section 34 for transmitting a search request object from the user to the existent search system. The conceptual information display section 31, the property information display section 32 and the relational information display section 33 respectively include tree structure display sections 53, 55 and 57 for displaying tree structure information on the browser, and user request processing sections 54, 56 and 58 for receiving an input from the user with respect to the tree structure information displayed on the browser.

In the vocabulary information processing mechanism 41, an ontology corresponding to a selected service is loaded by the vocabulary information loading section 62. As an example of vocabulary information to be loaded, there is the following in case of an ontology to be used upon comparing personal computers of the respective companies.

Class CPU sameAs processor
Class processor sameAs CPU
Class cache memory
Class L2 cache subClassOf cache memory
Class weight subClassOf
  unionOf body weight
    battery weight where "sameAs" represents "having the same meaning as", "subClassOf" represents "relationship between superordination and subordination", and "unionOf" represents "including". Namely, the CPU and the processor have the same meaning, and the L2 cache and the cache memory are in a relationship between superordination and subordination. Further, for example, by defining a relationship that "weight" is "body weight"+ "battery weight" using an ontology, it is possible to convert into useful information for a user.

As described above, the vocabulary information offered by the vocabulary information processing mechanism 41 may include, with respect to relationships between vocabularies, not only general relationships such as a superordinate/ subordinate conceptual relationship, synonyms, antonyms and analogues, but also relationships peculiar to the vocabularies (physical relationship, time series relationship, system of units) and various relational definitions according to individual definitions by a vocabulary information definer. Specifically, in this embodiment, expansion/parsing/compression of vocabulary information include a superordinate/ subordinate conceptual relationship, synonyms, antonyms, analogues and application of an inference based on a logical operation or a predicate relationship. Further, such vocabulary information includes information forming the fundamental concept and information produced depending on a domain. The information produced depending on a domain may be based on the information forming the fundamental concept and refer to vocabulary information of other domains.

The inference processing mechanism 42 uses the inference engine 63 to extend/parse various vocabulary information, thereby serving to induce a search request from the user terminal 11 to more accurate one. Here, the inference processing is implemented using axiom rules being a rule group described in a rule describing format accepted by the inference engine 63. In this inference processing, the inference engine 63 is used for carrying out semantic executing of an ontology. In the inference engine 63, under the control of the inference engine execution control mechanism 64, a syllogism, for example, is carried out only from facts, wherein, for inferring from facts (metainformation described in ontology language) scattered on the Web, a categorical syllogism, for example, is carried out. As this categorical syllogism, there can be cited, for example,

| | |
|---|---|
| (major premise) | All men are mortal. |
| (minor premise) | Socrates is a man. |
| (conclusion) | Hence, Socrates is mortal. |

A normal syllogism based on a logical language is expressed by a mixed hypothetical syllogism composed of a fact (categoricalness) and a conditional implication, i.e. if-then (hypothesis). In an example of the logical language,
mortal(X):-man(X) (major premise) hypothesis (condition)
man(socrates). (minor premise) categoricalness(fact)
? - mortal(socrates).      ® yes. (conclusion).

As mounting of a categorical syllogism, it becomes as follows in mounting of a transitive law.

```
/*TransitiveProperty*/
if        pv(type, ?p, TransitiveProperty) and
          pv(?p,?x,?y) and
          pv(?p,?y,?z)
then
          pv(?p,?x,?z).
```

In this manner, the axiom rule for deriving a new fact from facts using a syllogism by, for example, excluding disjointed ones and obtaining ones of the same value, is used. Incidentally, other than the categorical syllogism, there are also available those axiom rules for driving an inverse relationship, a disjointed relationship respectively.

Now, GUI of the ontology search UI system according to this embodiment will be described. In this embodiment, there is proposed GUI of the search system using the ontology technology, for enabling a user to definitely designate his/her likings and interests thereby to extract an accurate result reflecting user's minute needs. Here, after reading an ontology file, a parent-child relationship designated by subclassof (parent-child relationship) is extracted to produce a tree structure of concepts (classes), which is then displayed on the browser of the user terminal 11. Further, details of various properties are read from properties designated by the respective concepts and, when a concept is selected from the conceptual tree displayed on the browser, the details of the corresponding property are displayed on the browser.

Figure 3:
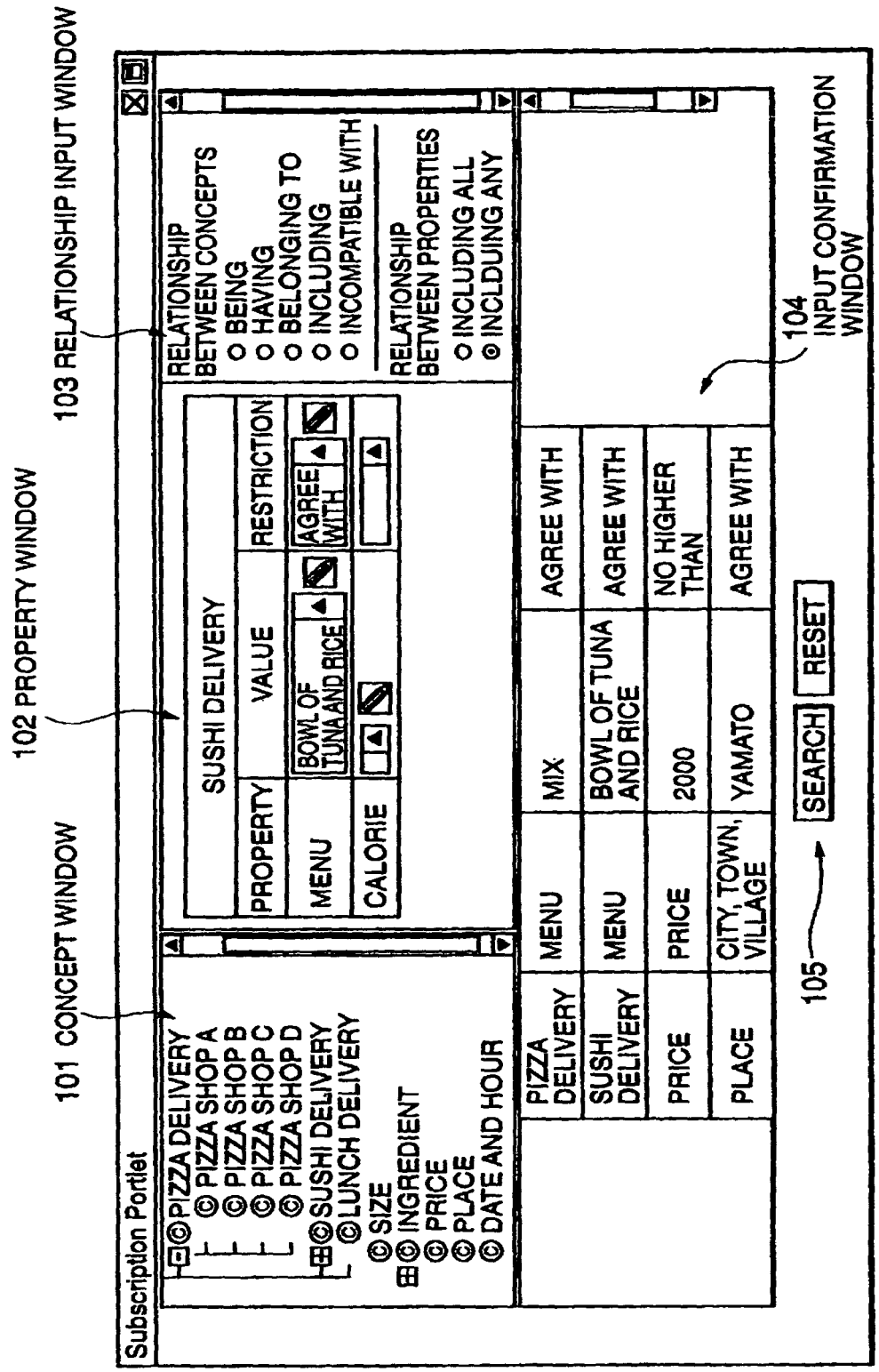
FIG. 3 is a diagram showing an example of GUI for an ontology search displayed by a browser of a user terminal.

FIG. 3 is a diagram showing an example of GUI for an ontology search displayed by the browser of the user terminal 11. Here, a search screen for a user is offered by dividing into a concept window 101, a property window 102, a relationship input window 103 and an input confirmation window 104. The concept window 101 is displayed based on information from the conceptual information display section 31 shown in FIG. 2, and the property window 102 is displayed based on information from the property information display section 32. Further, the relationship input window 103 is displayed on the browser based on information from the relational information display section 33. After inputting them and confirming it, a search request is issued by pushing a search button 105. The concept window 101 displays concepts in a tree structure, and a user can select an intended concept by tracing the tree of the concept window 101. Here, class information read from an ontology stored in the memory 40 is displayed in a tree format, and expansion or compression of the tree can be achieved by designating "+" or "−". By using the tree structure, the user can easily select a field the user is interested in. Further, other than using the tree, it can also be configured to assist a user's register operation by, for example, distinguishing a currently selected class (concept) by coloring, or changing a color of a link for a class in which a registered property exists.

The property window 102 is configured to enable selection of properties of the concept selected in the concept window 101. In the column of "property", items for which inputting of a property is allowed are displayed, and restriction conditions that can be designated are determined depending on such an item. For example, if a numerical value is a property that can be inputted as "value", a restriction condition of a greater or smaller relationship or an equivalent relationship can be designated. In this property window, "value" and "restriction" are displayed as pull-down menus. In the relationship input window 103, it is possible to input a relationship between the concepts selected in the concept window 101 and a relationship between the properties inputted in the property window 102. For example, it is possible to input a relationship between classes (concepts) and a relationship between properties using radio buttons. In the input confirmation window 104, a display is performed for confirming the inputs of the properties inputted in the property window, the relationships inputted in the relationship input window. Here, for example, the inputted property information is displayed in a table format, and the inputted relationship between the classes (concepts) and the inputted relationship between the properties are displayed. The input confirmation window 104 is displayed on the browser based on display commands obtained from input confirmation window display means of the conceptual information display section 31, the property information display section 32 and the relational information display section 33 of the information distribution system 24 via the Internet 10.

Here, it is assumed that there is a search example of "What is the title of a movie into which a song with words of 'Rain drops are falling on my head' is inserted ?". In response to a search request from the user terminal 11, an ontology is first selected relative to the ontology search portal 21 so that a domain to be searched is selected. In this event, the service option display section 51 of the ontology search portal 21 handles URL+ontology classification as a user concerned service list and displays a service list corresponding to the registered ontology URL. In this service list, the contents to be displayed change depending on user's likings. The service list may be, for example,

| UsersInterest | |
|---|---|
| Movie Information Service | (URL1 http://xxx.yyy) |
| Music Information Service | (URL2 http://yyy.xxx) |
| PC information Service | (URL1 http://zzz.nnn). |

When, for example, "Music Information Service" is selected and the search button 105 of "SEARCH" shown in FIG. 3 is clicked on the browser in the user terminal 11, the user request processing section 52 of the ontology search portal 21 recognizes such a user's request and outputs the recognition thereof to the conceptual information display section 31.

In the vocabulary information loading section 62 of the vocabulary information processing mechanism 41, calling of a music information ontology corresponding to the music information service, for example, is implemented. In the vocabulary information managing mechanism 61, the loaded ontology is parsed and, for example, necessary information such as a parent-child relationship between concepts or property information/relational information corresponding to the respective concepts is extracted. The extracted information is extended/parsed by the inference processing mechanism 42 using axiom rules and stored in the memory 40 as, for example, a conceptual tree structure taking the parent-child relationship into account. Further, details of properties (limitation in value that can be taken or inputted) corresponding to the respective concepts are stored in the memory 40, and a relational tree structure definable between the concepts is stored in the memory 40.

The conceptual information display section 31 reads the tree structure of the parsed and extracted concepts from the memory 40 and displays the conceptual tree structure taking the parent-child relationship into account on the browser of the user terminal 11. Specifically, after receiving selection of a service from the service list displayed by the service option display section 51 of the ontology search portal 21, the conceptual information display section 31 serves to extract the conceptual tree from the ontology read by the vocabulary information processing mechanism 41 and display it. For example, the conceptual tree has the following data structure.

```
Object
    class Music
                    subclassof Art
    class Popular
                    subclassof Music
    class Jazz
                    subclassof Music
    class Classic
                    subclassof Music
    class Pops
                    subclassof Music
    class Folk
                    subclassof Music Entry 1
```

Using such a data structure, a scenario may be considered wherein, for example, "Music" is selected from "Art" and "Movie" is selected from "Event" in a conceptual tree.

The property information display section 32 displays details of properties corresponding to the parsed and extracted concepts (classes) on the browser of the user terminal 11. Specifically, when one of the concepts displayed on the browser by the conceptual information display section 31 is selected, the property information display section 32 serves to display properties corresponding to the selected concept. The data structure is, for example, as follows.

```
class Musical Instrument
    propgenre Popular, Jazz, Classic, Film Production str
    propProducer""str
    propProductionCompany""str
    propType""str
    propProductionYear""str
class String Instrument
    subclassof Musical Instrument
    propGenre Popular, Jazz, Classic, Movie Music str
    propProducer""str
    propProductionCompany""str
    propType""str
    propProductionYear""str
```

Using such a data structure, a scenario may be considered wherein, for example, by inputting actual words as a value and "=" as limitation after selecting the concept of Movie Music, the value of the property is determined. It is to be noted that prop represents a property.

The relational information display section 33 displays properties representing a relationship between the user selected concepts and a relationship between the user selected properties, on the browser of the user terminal 11. When two or more concepts or properties are selected, a predicate relationship corresponding to the two or more concepts or properties is displayed. For example, there are "sameClassAs" or "samePropertyAs" as an equivalent relationship, "subClassof" or "subPropertyof" as a superordinate/subordinate relationship, "TransitiveProperty" as a transitive relationship, "disjointWith" as an exclusive relationship, "inversof" as an inverse relationship. By designating the relationship displayed by the relational information display section 33, it is possible to select an expression of a relation like, for example, a certain instance of the "Music" concept is included in a certain instance of the "Movie" concept (words of a movie are sounded in a certain movie). By enabling such selection, it can be defined that it is "words" included in "a movie" and it is not "music words as a temporary measure although it is not actually known", and therefore, a search request from the user terminal 11 can be accurately expressed. Further, it becomes also possible to make a search request fall into an ontology and turn it over to various search techniques existing on the Semantic Web.

The search request transmitting section 34 transmits a search request object from the user terminal 11 to the search system server 15 being the existent search system. For example, assuming that there is a request for retrieving information of a musical composition based on part of phrases of a song used in a certain movie, by transmitting a condition designated by Condition Elements as shown below, it becomes possible to receive from the search system a search result designated by Result Elements. For example,

```
<Query>
<Condition>
<Movie>
<contain resource="aSong">
</Movie>
<Song id="aSong">
    <contain "Rain drops falling on my head"/>
</Song>
</Condition>
<Result>
<Movie><Title>?</Movie></Title>
</Result>
</Query>
```

Such an XML (Extensible Markup Language) file is sent onto the Semantic Web, and subsequent processing is left to the search mechanism.

Figure 4:
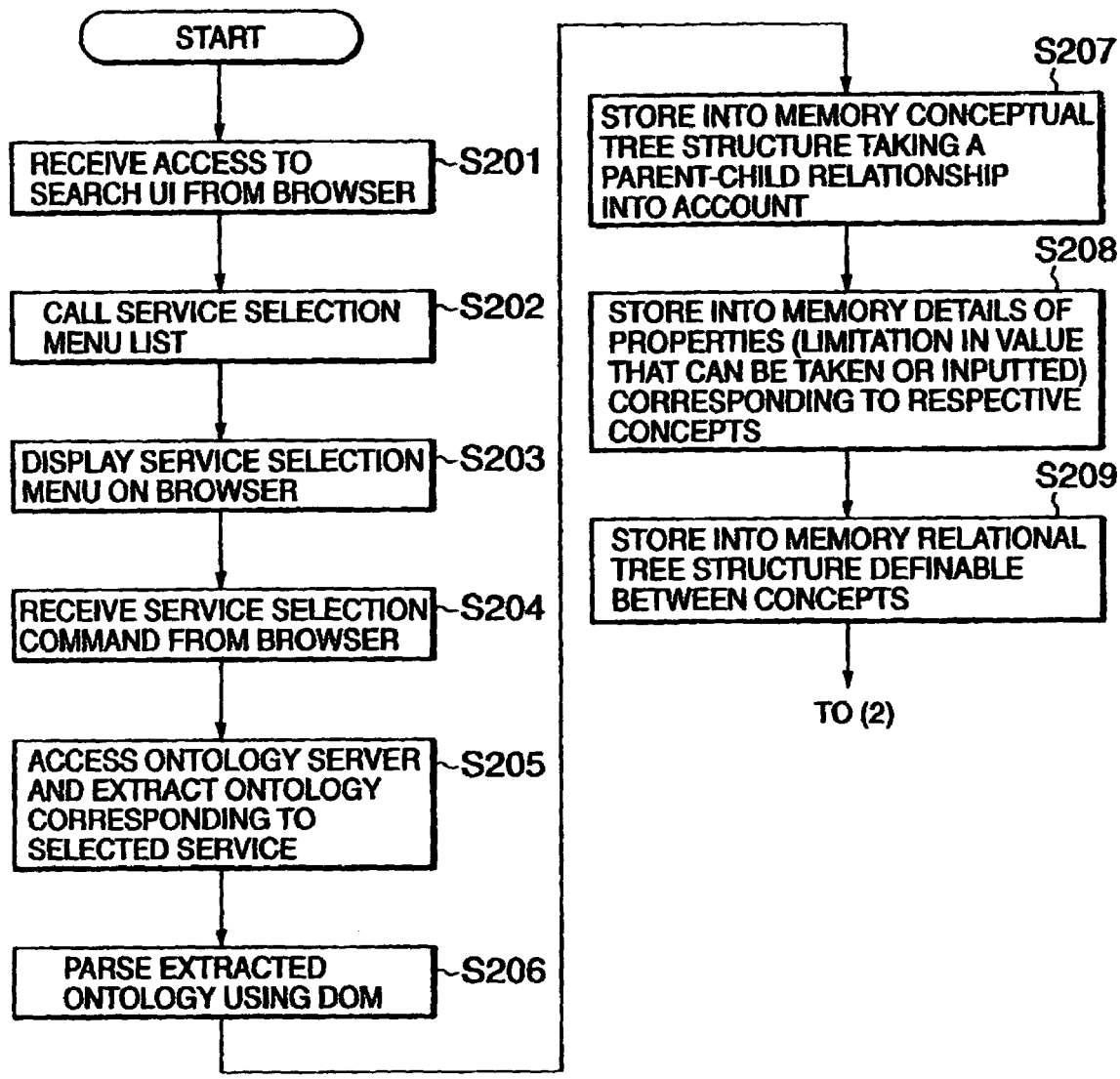
FIG. 4 is a flowchart showing the first processing implemented by respective functions shown in the block diagram of FIG. 2.

Now, using flowcharts shown in FIGS. 4 to 6, such processing will be described. FIG. 4 is a flowchart showing the first processing implemented by the respective functions shown in the block diagram of FIG. 2. First, access to the search UI from the browser of the user terminal 11 is received via the network (step S201). In response to the access, a service selection menu list is called in the ontology search portal 21 (step S202). Then, the service option display section 51 of the ontology search portal 21 transmits the called service selection menu via the Internet 10 for displaying it on the browser of the user terminal 11 (step S203). Thereafter, the user request processing section 52 of the ontology search portal 21 receives a service selection command from the browser (step S204) and outputs this information to the information distribution system 24.

The vocabulary information processing mechanism 41 of the information distribution system 24 having received this information accesses the ontology server 23 using the vocabulary information loading section 62 and extracts an ontology corresponding to the selected service (step S205). The vocabulary information managing mechanism 61 parses the extracted ontology using DOM (Document Object Model)(step S206). Then, it stores into the memory 40 a conceptual tree structure taking a parent-child relationship into account (step S207) and stores into the memory 40 details of properties (limitation in value that can be taken or inputted)

corresponding to the respective concepts (step S208). Subsequently, it stores into the memory 40 a relational tree structure definable between the concepts (step S209), then the processing advances to a flowchart (2).

Figure 5:
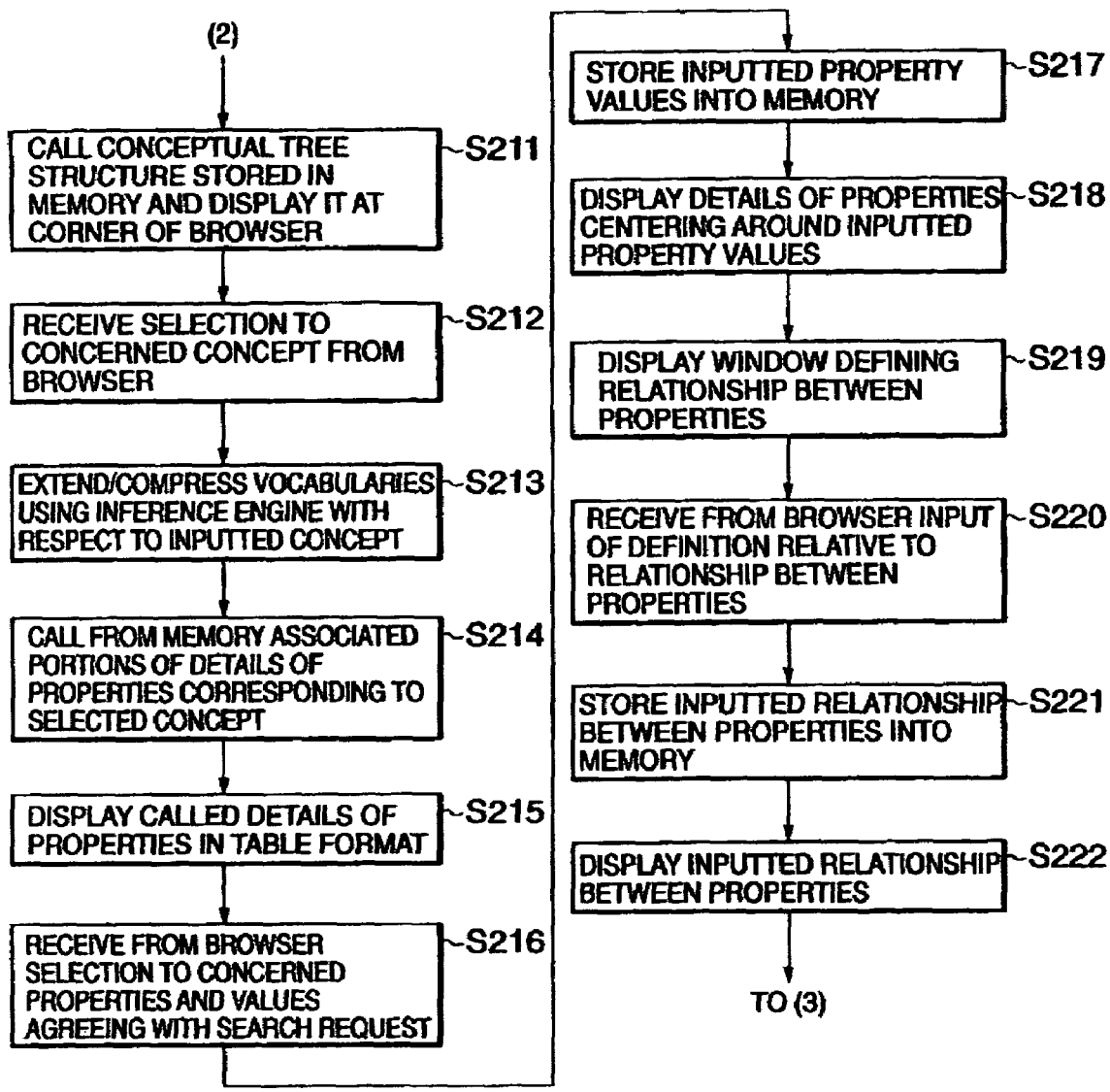
FIG. 5 is a flowchart showing the continuation of FIG. 4.

FIG. 5 shows the continuation of the flowchart shown in FIG. 4. As shown in the flowchart (2), the tree structure display section 53 of the conceptual information display section 31 calls a conceptual tree structure stored in the memory 40 and displays it at a corner of the browser of the user terminal 11, for example, like the concept window 101 shown in FIG. 3 (step S211). With respect to the concept designated by the user, as being interested in, through the concept window 101 on the browser, the user request processing section 54 of the conceptual information display section 31 receives selection to this concept from the browser of the user terminal 11 (step S212). In the inference processing mechanism 42, the inference processing is executed relative to the inputted concept for extending/compressing vocabularies using the inference engine 63 (step S213), and the execution result is stored in the memory 40.

The property information display section 32 calls from the memory 40 associated portions of details of properties corresponding to the selected concept (step S214). Then, the tree structure display section 55 of the property information display section 32 displays the details of the properties called from the memory 40 in a table format on the browser of the user terminal 11 via the Internet 10 (step S215). The displayed details of the properties become, for example, like the property window 102 shown in FIG. 3. Thereafter, the user request processing section 56 of the property information display section 32 receives information the user has selected as concerned properties based on the table displayed on the browser and values inputted by the user as values that agree with the search request, from the browser via the Internet 10 (step S216). Further, the property information display section 32 stores the inputted property values into the memory 40 (step S217).

The tree structure display section 57 of the relational information display section 33 calls the property values from the memory 40 and displays on the browser of the user terminal 11 via the Internet 10 details of the properties centering around the inputted property values (step S218). Here, when two or more properties are inputted, a window defining relationships between the properties is displayed on the browser (step S219). For example, a display as shown on the lower side of the relationship input window 103 shown in FIG. 3 is carried out. Based on the relationships between the properties displayed on the browser of the user terminal 11, the user request processing section 58 of the relational information display section 33 receives an input of definition relative to the relationship between the properties from the browser (step S220) and stores the inputted relationship between the properties into the memory 40 (step S221). Then, as, for example, the input confirmation window 104 shown in FIG. 3, the user request processing section 58 displays the inputted relationship between the properties on the browser (step S222), and the processing proceeds to a flowchart (3).

Figure 6:
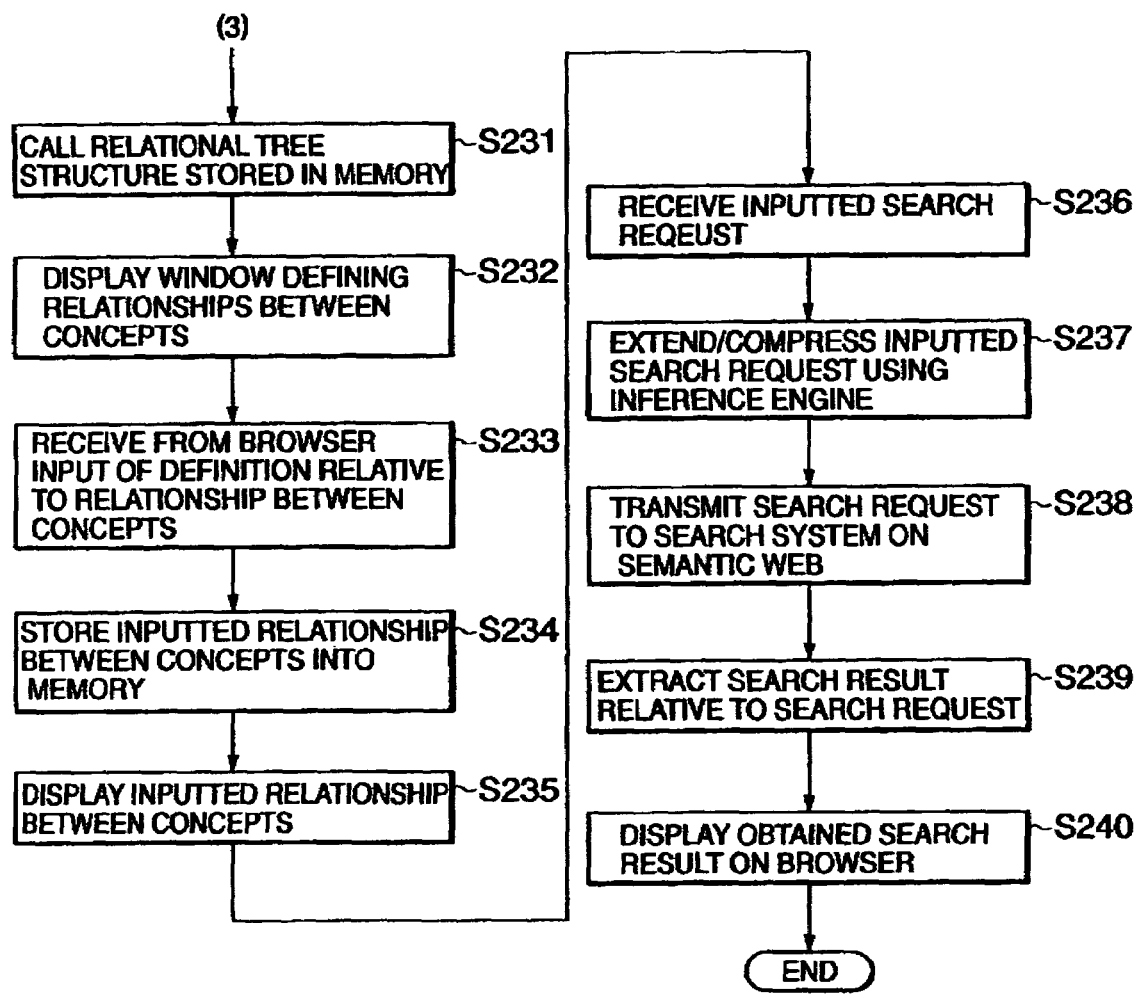
FIG. 6 is a flowchart showing the continuation of FIG. 5.

FIG. 6 shows the continuation of the flowchart shown in FIG. 5. In the flowchart (3), when two or more concepts are selected from the browser of the user terminal 11, a relational tree structure stored in the memory 40 is called for defining relationships between the selected two or more concepts (step S231). The tree structure display section 57 of the relational information display section 33 displays a window defining the relationships between the concepts, which is stored in the memory 40, on the browser of the user terminal 11 via the Internet (step S232). For example, a display as shown on the upper side of the relationship input window 103 shown in FIG. 3 is carried out. Based on the relationships between the concepts displayed on the browser of the user terminal 11, the user request processing section 58 of the relational information display section 33 receives an input of definition relative to the relationship between the concepts from the browser (step S233) and stores the inputted relationship between the concepts into the memory 40 (step S234). Then, as, for example, the input confirmation window 104 shown in FIG. 3, the user request processing section 58 displays the inputted relationship between the concepts on the browser (step S235).

In response to, for example, depression of the search button 105 shown in FIG. 3, the search request transmitting section 34 receives a search request inputted from the browser via the Internet 10 (step S236). In the inference processing mechanism 42, the inputted search request is extended/compressed using the inference engine 63 (step S237). The search request transmitting section 34 transmits this extended/compressed search request to, for example, the search system on the Semantic Web via the Internet (step S238). Thereafter, the information distribution system 24 extracts a search result relative to the search request made from the browser (step S239), transmits the obtained search result via the Internet 10, and displays it on the browser of the user terminal 11 (step S240), and the processing is terminated.

Figure 7:
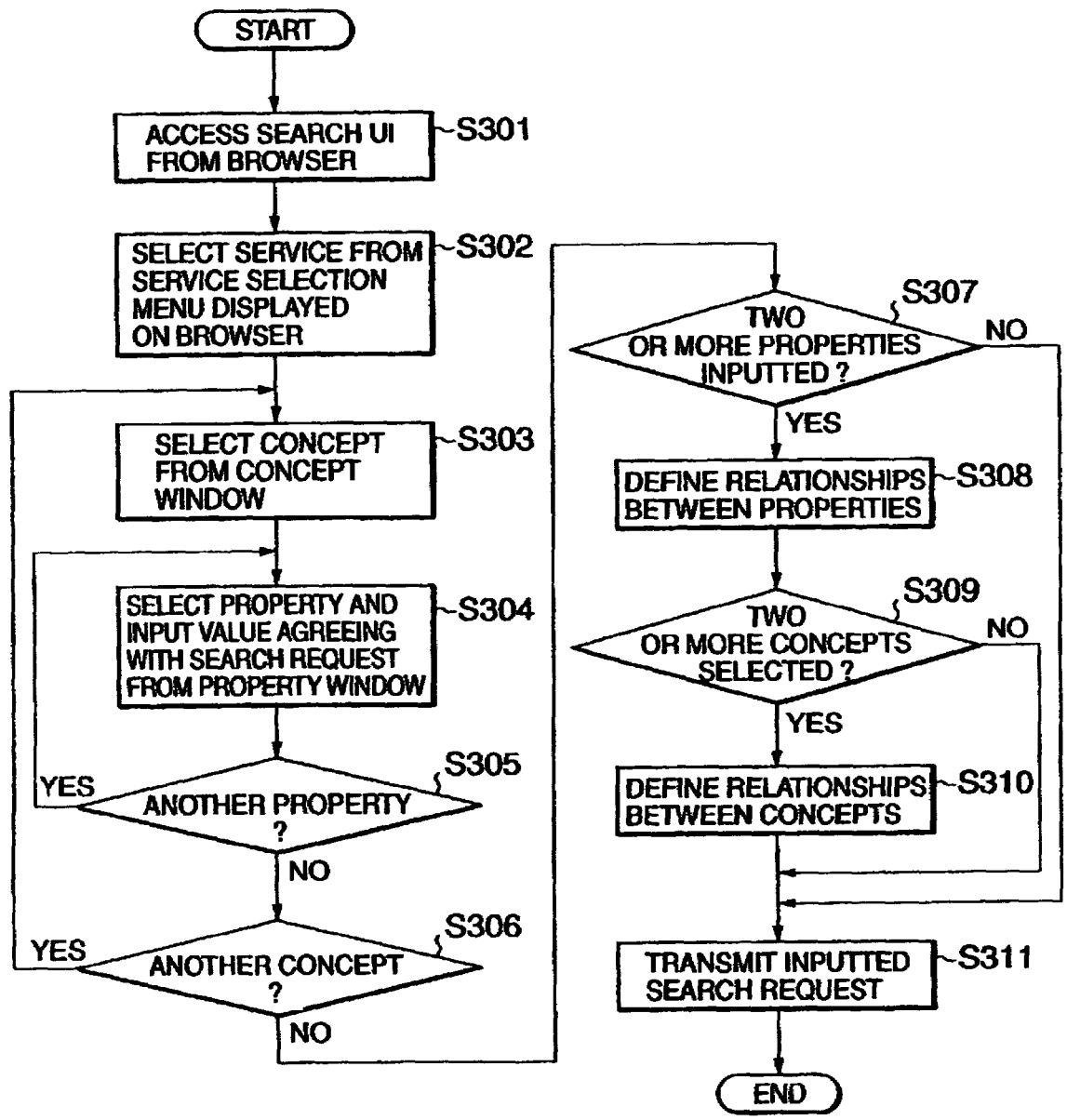
FIG. 7 is a flowchart showing processing implemented on the side of the browser of the user terminal.

FIG. 7 is a flowchart showing the processing implemented on the side of the browser of the user terminal 11. First, in the user terminal 11, access is made to the search UI from the browser (step S301). Then, a service to be searched is selected from a service selection menu that is called by the ontology search portal 21 of the Web application server 20 and displayed on the browser based on the access to the search UI (step S302). Thereafter, in the user terminal 11, a concept is selected in the concept window 101 shown in FIG. 3 (step S303), and a property is selected and a value agreeing with the search request is inputted in the property window 102 (step S304).

Here, it is checked whether or not there is another property (step S305). If there is another property, selection and inputting are implemented at step S304. If there is not another property, it is checked whether or not there is another concept (step S306). If there is another concept, the processing from step S303 is executed. If there is not another concept, it is checked whether or not two or more properties are inputted (step S307). If two or more properties are inputted, relationships between the properties are defined using the relationship input window 103 as shown in FIG. 3 which is displayed on the browser (step S308). Then, it is checked whether or not two or more concepts are selected (step S309). If two or more concepts are not selected, the processing proceeds to step S311. If two or more concepts are selected, relationships between the concepts are defined (step S310). Then, the inputted search request is transmitted to the Web application server 20, and the processing on the side of the user terminal 11 is terminated.

As described above in detail, in this embodiment, concepts about a certain domain, properties forming the concepts, and ontologies being vocabularies formally expressing relationships between the concepts and between the properties and being conceptual relationships are used. And using them, it is configured to offer a window element displaying relationships between the concepts using a mesh structure formed from a tree structure expression having multiple roots (e.g. the concept window 101 shown in FIG. 3), a window element displaying relationships between the properties using a mesh structure formed from a tree structure expression having multiple roots (e.g. the property window 102 shown in FIG. 3), and a window element displaying limitation with respect to the properties forming the concepts and values that can be taken by the properties (e.g. the relationship input window 103 shown in FIG. 3). Using these window elements, a user can designate relationships between the concepts and between the properties using a domain ontology.

Consequently, by using the search method according to this embodiment, for example, numerical data can be minutely searched and reflected. According to the conventional full text search, there have been adopted, for example, a search method wherein a plurality of words are inputted and relationships between them are defined using only the AND, OR and NOT logical operators, and a search method wherein a natural language is inputted and a morphemic analysis is conducted to extract words, thereby implementing a search. However, according to these methods, what can be performed is only simple pattern matching of words and, for example, if numerical data is inputted as a word, a relationship with another word can not be correctly understood so that it is not possible to conduct an accurate search. For example, conventionally, assuming that "age, 25 to 30" is used as a search key, it is only possible to retrieve those sentences including "age", "25" and "30". For example, even when "no less than 25 years old and less than 30 years old" is used as a search key, if synonyms and analogues of "no less than" and "less than" are not defined, an intended search is not possible. Further, according to extraction of words based on the morphemic analysis, the search key is divided into "25 years old", "no less than", "30 years old" and "less than", and thus, the condition can not be correctly reflected. On the other hand, according to the foregoing embodiment, values that can be taken by respective properties and limitation thereof can be determined. Further, using the ontology, it is possible to conduct a search taking into account a swing of words such as synonyms or analogues. By seeking out properties the user wishes to search and selecting therefrom limitation (e.g. no less than ~ and less than ~, smaller than ~) the user wishes to input, the user operating the user terminal 11 can input a search key easily and flexibly.

Further, according to this embodiment, 5W1H can be minutely searched. For example, according to the conventional full text search, it is difficult to reflect minute needs including 5W1H such as "news of English conversation school this one month". For example, if a search is performed on a word basis, "this one month", "English conversation school" and "news" are used as search keys, however, the system can not understand a mutual semantic relationship or the concepts of time, and place. Therefore, those articles that satisfy pattern matching are simply extracted so that an accurate search is not made possible. Further, in the directory search, inasmuch as information included in a category is limited, there frequently arises those instances where a proper noun such as a name of a place or person does not exist, so that it is not possible to conduct an accurate search. On the other hand, according to this embodiment, using the ontology, it is possible to perform inputting that takes a time width into account, or newly input a proper noun such as a name of a place or person following a property, so that a flexible search reflecting a mutual semantic relationship can be achieved.

Further, according to this embodiment, classes of the same category can be selected based on a tracing manner of the tree so that the category can be easily selected. Specifically, according to the existent directory search system, upon selecting a category, it is necessary to search out a concerned field from among many categories. Thereupon, child categories are first displayed when a parent category has been designated. Accordingly, it is difficult to see the whole, and thus complexity is increased. On the other hand, according to this embodiment, as shown in the example of FIG. 3, a search can be performed in a tree format so that the whole can be seen through and a category search matching user's thought can be implemented. For example, when searching for a category of a composer, it is possible to retrieve it by tracing a tree taking a human being as a basis, such as "human being—artist—musician—composer", and it is also possible to retrieve it by tracing a tree taking music as a basis, such as "art—music—musician—composer". Whichever tree is traced, it is possible to easily retrieve it while extending/compressing the tree.

Further, according to this embodiment, it is possible to select properties from a plurality of classes and define a relationship between the properties. According to the existent search system, when conducting a search reflecting minute needs such as "at restaurant in Shinjuku, only Japanese-style food or Chinese-style food, reservation possible", it is necessary to make a registration like "Shinjuku", "reservation possible" and "Japanese-style food" or "Chinese-style food", while it is difficult to conduct a search in a lump all together. In gourmet dedicated sites, there are cases where classification of place names or meals is performed per category. However, processing can only be carried out in a predetermined template, thus lacking in flexibility. For example, according to the current system, there is no classification like restaurant of "home-like". Thus, a search can not be conducted based on such classification. On the other hand, according to this embodiment, inasmuch as respective properties can be easily inputted and a relationship can be defined per property, a search can be implemented with complicated needs all together.

Further, according to this embodiment, a relationship about a plurality of classes can be defined. According to the existent search system, it is difficult to conduct a search reflecting a relationship of the subject/predicate like "including", "belonging" or "being incompatible" such as "recipe of main dish using green and yellow vegetable 'including' iron". If a search is conducted in this example using the existent full text search engine, a lot of pages other than intended recipes (e.g. pages recommending a diet or diary pages including those words individually) are searched out. On the other hand, according to the input method in this embodiment, it is possible for a user to select a plurality of classes and define a relationship of the subject/predicate between those classes like "including" or "belonging" and "being incompatible". For example, when wishing to input "vegetable" (green and yellow vegetable) including "mineral" (iron) as a search key, a "vegetable" class is first selected, then a "mineral" class is selected, and finally the predicate "including" representing a relationship between them is selected, so that a relationship of the subject/predicate between the classes can be defined. When a specific search key "iron□ green and yellow vegetable" is given after implementing the definition, the internal system of the Semantic Web automatically recognizes it as "vegetable" including "mineral" and performs the processing, so that an accurate search can be achieved.

While the invention has been described with respect to certain preferred embodiments and exemplifications, it is not intended to limit the scope of the invention thereby, but solely by the claims appended hereto.

We claim:

1. An information search support system comprising:

ontology extracting means for, based on a service selection command from a browser, extracting an ontology, said ontology displaying relationships among metadata and predicate relationships as concepts and properties, vocabularies, and parent-child relationships, said ontology corresponding to a selected service;

storing means for analyzing the ontology extracted by said ontology extracting means and storing into a memory a conceptual structure and details of properties corresponding to respective concepts, including the relationships among metadata and predicate relationships as concepts and properties, and parent-child relationships;

concept window display means for calling said conceptual structure, including the relationships among metadata and predicate relationships as concepts and properties, and parent-child relationships stored in said storing means and displaying it in a display area of said browser;

inference engine means for extending or compressing vocabularies relative to the concepts selected from said concepts;

and property window display means for calling from said storing means details of a property corresponding to a concept selected from said conceptual structure displayed by said concept window display means and displaying them in a display area of said browser;

a vocabulary information processing mechanism for loading an ontology corresponding to a selected service, said ontology displaying relationships among metadata and predicate relationships as concepts and properties, and parent-child relationships, displayed as trees, said ontology and analyzing the loaded ontology to extract a conceptual structure;

a conceptual information display section for displaying said conceptual structure extracted by said vocabulary information processing mechanism on a browser of a user terminal via a network;

a property information display section for displaying on said browser property information relative to a concept selected from the conceptual structure displayed on said browser by said conceptual information display means;

and a relational information display section for displaying, when a plurality of concepts are selected by said conceptual information display section, relationships between the concepts on the browser.

2. The information search support system according to claim 1, wherein said conceptual information display section displays on said browser a concept window in which a prescribed concept can be selected by tracing a tree:

said property information display section displays on said browser a property window displaying an item for which inputting of a property is allowed, said property window enabling inputting of a restriction condition relative to said item;

and said relational information display section displays on said browser a relationship input window that enables inputting of a relationship between said concepts or a relationship between properties selected by said property information display section.

3. The information search support system according to claim 1, further comprising an inference processing mechanism for executing an inference operation based on an axiom rule and extending or parsing vocabulary information extracted by said vocabulary information processing mechanism.

4. The information search support system according to claim 1, further comprising a search request transmitting section for transmitting to a search system a prescribed search request based on a search request made relative to said windows displayed on said browser by said conceptual information display section, said property information display section and said relational information display section.

5. The information search support system according to claim 1, further comprising an ontology search portal for calling a service selection menu list based on access made from said browser in said user terminal, displaying said service selection menu on said browser, and accessing an ontology server offering said ontology based on service selection from said browser.

* * * * *